Aug. 11, 1964 R. S. ENGELBRECHT 3,144,615
PARAMETRIC AMPLIFIER SYSTEM
Filed Feb. 26, 1959 2 Sheets-Sheet 1

INVENTOR
R. S. ENGELBRECHT
BY R. C. Winter
ATTORNEY

INVENTOR
R. S. ENGELBRECHT
BY R. C. Winter
ATTORNEY

United States Patent Office 3,144,615

Patented Aug. 11, 1964

3,144,615

PARAMETRIC AMPLIFIER SYSTEM

Rudolf S. Engelbrecht, Basking Ridge, N.J., assignor to Bell Telephone Laboratories, Incorporated, New York, N.Y., a corporation of New York Filed Feb. 26, 1959, Ser. No. 795,871

15 Claims. (Cl. 330—4.6)

This invention relates to traveling wave parametric amplifying systems and, more particularly to arrangements of pairs of parametric amplifiers.

It has been known heretofore in the parametric amplifier art that a signal wave may be amplified by variably intercoupling to it energy from an energy supplying wave as the two waves are propagated along associated paths. For effecting amplification, the intercoupling between the two waves must be accurately controlled. For convenience of analysis, this intercoupling between the two waves has been viewed as a third wave, commonly termed a pump wave.

For effecting signal amplification it is necessary in parametric amplifiers to transfer energy to the signal wave, and, as well, to a sideband wave which results from intermodulation action between the signal wave and the pump wave. Thus, both the signal wave and this sideband wave, each of which contains the information significance of the original signal wave, absorb energy and are amplified. With particular amplifying advantage, this energy transfer is, through the action of a pump wave at a relatively high frequency, to the signal wave and to the lower sideband wave which results from the above-noted intermodulation action. This lower sideband wave, exhibiting particularly advantageous characteristics, has acquired the distinctive name of "idler" wave.

The frequency of this idler wave, by virtue of its above-noted origin, either lies between that of the signal wave and that of the pump wave or, conversely, the signal wave frequency lies between that of the idler wave and that of the pump wave. From an amplifying standpoint, as noted above, this arrangement of frequencies has proven to be of particular advantage. Quite to the contrary, from a frequency bandwidth standpoint, the bandwidth of a signal wave to be amplified has been limited by the very presence of the idler wave. For example, in the former one of the above-noted converse situations, the idler wave stands in the frequency spectrum as a barrier between the signal wave and pump wave to limit the frequency bandwidth of the signal wave. That is, the idler wave intermingles with a signal wave of too great a bandwidth. Such an intermingling gives rise to incoherence in the information bearing, amplified, output waves, both idler waves and signal waves, insofar as the intermingled frequency portions of the two waves are concerned.

Accordingly, it is a more specific object of the present invention to extend the frequency bandwidth throughout which a parametric amplifier system may successfully amplify a signal wave without suffering the above-noted intermingling incoherence.

This objective is achieved in one illustrative embodiment of the invention by the employment of two parametric amplifying structures of matched gain characteristics and of similar electrical length in which the respective intercoupling pump waves are shifted in phase relation with respect to one another thereby to establish idler waves of corresponding phase shifted relation. At the same time, the signal waves in the two paths are undisturbed in their mutual phase relationship. More specifically, in this one illustrative embodiment of the invention, the signal waves are propagated in like phase relationship in the two amplifiers and the idler waves are propagated in opposed phase relationship. An output network is further provided for receiving the amplified signal waves and idler waves from each of the two parametric amplifying structures and for combining these received waves in both additive and subtractive relation. As a result of the phase shifted relationships established between the two idler waves, the above-noted combining network eliminates entirely the intermingling of signal and idler waves.

This elimination follows from the fact that the combining network delivers two output signals, an additive output signal and a subtractive output signal. Thus, the above-noted additive output signal is a combination of only the amplified signal waves propagated in both the parametric amplifiers and the added opposed phase idler waves provide mutual cancellation. Conversely, the subtractive output signal is a combination of only the idler waves propagated in these two parametric amplifiers. Accordingly, whatever incoherence may have been introduced, by the intermingling of the signal and idler waves in the individual parametric amplifiers, is eliminated. At the same time the amplified signal wave and the amplified idler wave, each of which contains all the information of the input signal wave, are made separately available for employment in further utilization circuits.

Thus, it is a feature of my invention that the structures of the invention include means for establishing opposed phase intercoupling waves in the two parametric amplifiers of a pair.

Similarly, it is a further feature of my invention that an additive and subtractive network is connected for receiving and combining the amplified information bearing output waves from the two amplifiers.

As gain is increased, instability presents an increasing obstacle to the use of an amplifier, i.e., spurious signals in a high gain amplifier may be so amplified as to destroy the intelligence of any useful signal applied to such an amplifier. This is particularly true of the traveling wave parametric amplifier in that establishment of proper propagation relationships for obtaining a desirable amplifying energy transfer to the signal wave is of itself a delicate technical problem. These proper relationships having been established in a wave propagating structure, this structure, without more, freely propagates waves at the energy absorbing frequencies of both signal waves and idler waves in either direction. Accordingly, any such waves reflected within the traveling wave parametric amplifier tend not to be attenuated but to be amplified again and again with each reflection.

Thus, traveling wave parametric amplifying systems normally require input signal circuits and output utilization circuits which have impedances exactly matched to the impedance of the amplifier. This requirement imposes severe restrictions upon the use of parametric amplifiers.

As the amplification bandwidth of a traveling wave parametric amplifier is increased, the difficulties of providing proper impedance matching input and output circuits also rises correspondingly. But even more, noting again the technical difficulty of assuring proper wave propagation relationships, as signal bandwidth is increased the very elements employed to ensure these proper propagation relationships tend to give rise to internal reflections over at least some portion of the effective amplifier bandwidth.

Accordingly, it is a still further object of my invention to eliminate instability from a traveling wave parametric amplifying system.

This objective is achieved in one illustrative embodiment of my invention by providing an energy dissipating impedance for an unused one of the two separate amplified waves delivered to an additive and subtractive output combining network by two paired traveling wave parametric amplifiers in which intercoupling pump waves are established in opposed phase relationship. Further, in this embodiment of the invention, a similar input combining network is provided for separating waves at the frequency of the other amplified wave and, thereafter, for applying this separated signal to an energy dissipating impedance.

Accordingly, at one end or the other of the parametric amplifying system, waves at the energy absorbing frequencies, i.e., at the system amplifying frequencies, are dissipated. Hence, all potentially regenerative reflected waves are immediately damped whatever the nature of the associated external circuits. As a result, spurious signal amplification is eliminated and the parametric amplifying system in accordance with the invention is readily adaptable to employment with external circuitry of any convenient impedance.

Thus, it is a feature of my invention that an impedance is connected to one terminal of an output combining network for dissipating the energy at the frequency of one of the two information bearing parametrically amplified signal and idler waves.

It is a further feature of my invention that signal waves are supplied to each of a pair of traveling wave parametric amplifiers through a sum and difference, input combining network to separate signals reversely propagated in the amplifiers at the frequencies of the above-noted signal and idler waves.

It is a still further feature of my invention that an impedance is connected to a terminal of the input combining network for dissipating energy at the frequency of that other one of two information bearing, parametrically amplified signal and idler waves which is not dissipated at the output combining network impedance.

A complete understanding of this invention and of these and various other features thereof may be gained from consideration of the following detailed description and the accompanying drawing, in which.

Figure 1:
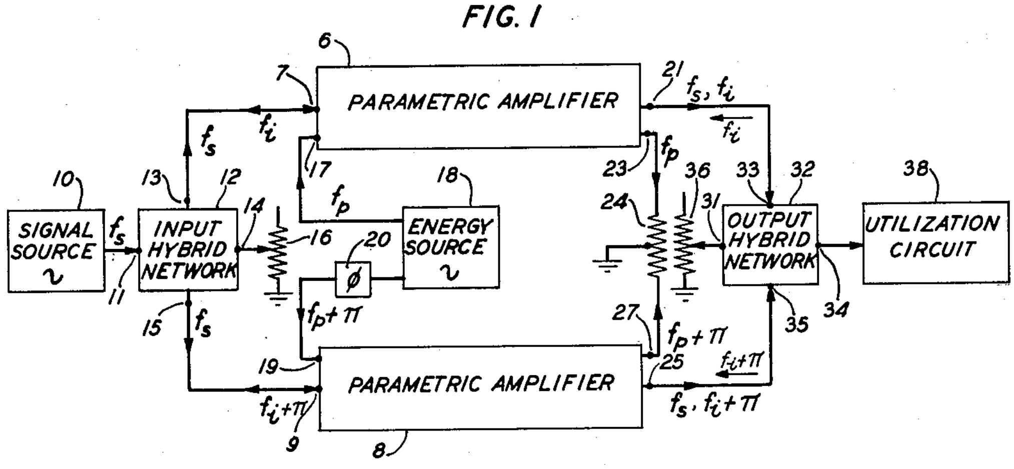
FIG. 1 is a block diagram of a parametric amplifying system in accordance with an illustrative embodiment of the invention.

Referring now more particularly to the drawing, in FIG. 1 there is shown a pair of traveling wave parametric amplifiers 6 and 8 of like gain characteristics and of similar electrical length connected for receiving from a source 10 a communication signal wave to be amplified. The length of these amplifiers may be similar in that, for frequencies of amplifying interest, the electrical length of one differs from the length of the other by a substantially integral number of half wavelengths. Advantageously, for simplicity of construction, the amplifiers 6 and 8 are of identical electrical length and of identical gain characteristics.

The communication signal has a center or carrier frequency $f_s$ and is applied through an input hybrid combining network 12 in like phase to each of the parametric amplifiers. While in this illustrative embodiment of the invention the signal wave is applied in like phase, it may indeed be applied to two parametric amplifiers in phase relations relatively independent one of another as will be clear from more detailed considerations below.

The parametric amplifiers 6 and 8 may be any one of many such amplifiers known in the art. Advantageously, they may be of the type described in a copending application of H. Suhl and P. K. Tien, Serial No. 724,103, filed March 26, 1958, and now abandoned. Further, these parametric amplifiers are of the type well known in the art for transferring energy from a locally available energy wave source through the action of a pump wave of non-linear reactance intercoupling to both a signal wave and to an idler wave which is the lower sideband wave resulting from intermodulation action between the signal wave and the intercoupling pump wave.

The signal wave source 10 may be any well-known communication signal wave source and, with particular advantage, may be a wave source of very high frequency as, for example, a high frequency radio signal source. The hybrid combining network 12 may be any one of the many hybrid networks known in the art for deriving output signals corresponding respectively to the sum and the difference of two applied input signals. An illustrative one of such circuits is discussed in more detail hereafter in a consideration of the circuits of FIG. 2.

The input signal is applied from the source 10 to a nominal sum terminal 11 of this hybrid network 12, and the communication signal wave is translated through nominal input terminals 13 and 15 of this network to signal input terminals 7 and 9 of the parametric amplifiers 6 and 8. From a difference terminal 14 of the network, an output lead is taken to an energy dissipating resistor 16. This resistor is matched to the parallel connected impedance of the parametric amplifiers 6 and 8.

An energy wave source 18, of frequency $f_p$, supplies energy to the two parametric amplifiers 6 and 8 at terminals 17 and 19, respectively. This energy wave source my be any of the well-known high frequency energy wave sources; for example, it may be a klystron tube.

An energy wave from this source is supplied directly to the one parametric amplifier 6 and, in opposed phase relation, to the other amplifier 8 through a phase shifter 20. As is well known in the parametric amplifier art, this energy wave serves to control a wave of intercoupling, i.e., a pump wave, for transferring energy to waves to be amplified. As noted heretofore, the parametric amplifiers 6 and 8 advantageously are constructed so that this energy is transferred through an intercoupling pump wave of relatively high frequency to both the signal wave and to the idler wave, which is the lower sideband wave resulting from intermodulation action between the signal wave and the intercoupling pump wave. The phenomenon of intercoupling is discussed at length in the aforementioned Suhl-Tien application. For present purposes, it is sufficient to explain this phenomenon as follows: If there are a plurality of variable capacitances connected along a transmission path, and, whether mechanically or otherwise, these capacitances are sequentially varied, it can be shown that, with proper phasing, work, i.e., energy, is added to the circuit. A signal wave traveling along the path encounters each varying capacitance in turn, and the energy introduced into the circuit by the work done in varying the capacitance is added to the signal wave, producing gain. Since there is a slight phase shift in the capacitance variation between successive capacitances, it can be said that there is a wave of capacitance variation traveling along the path. This wave may be, and often is, at the same frequency as the energy wave which produces the capacitance variation. It should be noted, however, that an electrical energy source, such as source 18, represents only one way of producing the varying capacitance. The variations in capacitance could, for example, be mechanically produced as well.

The signal wave, as it travels along the transmission path, encounters the varying capacitance wave. As is well known, a reactance variation in a circuit will produce a modulation of a signal wave on the circuit. If the frequency of the reactance variation "wave" differs from the signal frequency, there will be produced on the circuit a wave of a frequency equal to the difference between the signal frequency and the frequency of capacitance variation. This wave, in a parametric amplifier, is called the idler wave, and it, too, is amplified.

Figure 3A:
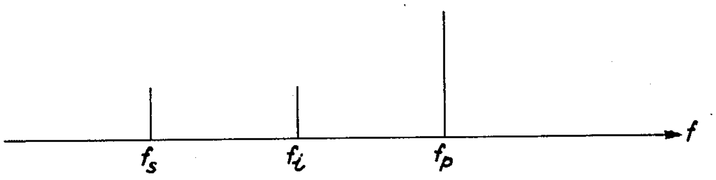
FIGS. 3A, 3B, and 3C are frequency diagrams of assistance in explaining the operation of the systems of FIGS. 1 and 2.

Such a frequency relationship may be better visualized with reference to FIG. 3A where the vertical lines arranged on a frequency scale from left to right and designated $f_s$, $f_1$, and $f_p$, respectively, represent the frequencies of the signal, idler and pump waves.

In propagation through the parametric amplifiers 6 and 8, both the signal and idler waves absorb energy from the source 18. The energy wave applied to the lower amplifier 8 is displaced in phase from the energy wave applied to the upper amplifier by $\pi$ radians through operation of the phase shifter 20. Accordingly, within the two amplifiers, the two idler waves are also displaced by $\pi$ radians.

At a first output terminal 21 of the upper amplifier 6, there appears a signal which is a composite of both the signal and the idler waves. At another output terminal 23 of this same amplifier, there appears a residual signal representing that portion of the energy wave not transposed for amplification to the signal and idler waves.

At a first output terminal 25 of the lower parametric amplifier 8, there appears a signal which is a composite of the amplified communication signal and of an associated idler wave which is shifted in phase by $\pi$ radians from its counterpart at the terminal 21. At a second output terminal 27 of this lower amplifier 8, there appears a signal containing the residual energy from the source 18. This lower amplifier residual signal is shifted by $\pi$ radians from its upper amplifier counterpart as a result of the action of the phase shifter 20 upon the wave supplied from the source 18. As shown in the drawing, these residual energy waves are applied in common to a resistor 24 for dissipation.

The two composite signals, both of which contain the two information bearing waves, the signal wave and the idler wave, are applied to the input terminals 33 and 35 of an output combining hybrid network 32. This output combining network 32 corresponds to the input network 12 heretofore discussed. From a sum terminal 31 of this output network, a wave is transposed to an energy dissipating resistor 36. This resistor is of a value calculated to match the parallel connected impedance of the amplifiers 6 and 8. Since the idler wave components appearing at the terminals 21 and 25 are phase displaced by $\pi$ radians, the entire wave derived from the sum terminal 31 is at the frequency of the signal wave. Thus, the resistor 36 precludes the reflection of energy into the parametric amplifiers at the frequency of the incoming communication signal wave.

At a difference terminal 34 of this hybrid network there appears a combined signal having components at the frequency of the idler wave only. This follows from the fact that the idler wave components appearing at the amplifier output terminals 21 and 25 are respectively displaced in phase by $\pi$ radians, i.e., are of opposite algebraic sign. Thus, an algebraic subtraction of these components is a physical addition of them. Conversely, the in-phase signal waves are physically eliminated in being subtracted at this difference terminal 34.

Figure 3B:
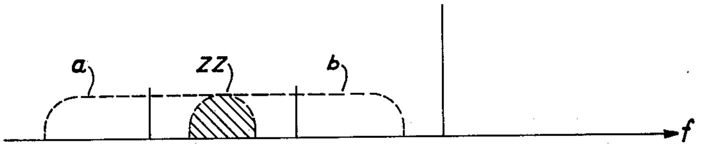

The physical implications of these statements may be more clear with further reference to FIG. 3. FIG. 3B in particular illustrates the arrangement of signal waves and idler waves in the frequency domain according to FIG. 3A as these waves actually appear in one of the parametric amplifiers, say in the upper amplifier 6. In FIG. 3B, dashed curves *a* and *b* are shown centered about the signal wave and idler wave fundamental frequencies $f_s$ and $f_1$, respectively. As shown, these dashed curves *a* and *b* intersect over a hatched area designated ZZ. These dashed curves respectively represent the frequency band corresponding to the information carried by the signal wave and the idler wave. The hatched area represents incoherence in the total information content of the two waves resulting from the intermingling of the frequency components of both.

Figure 3C:
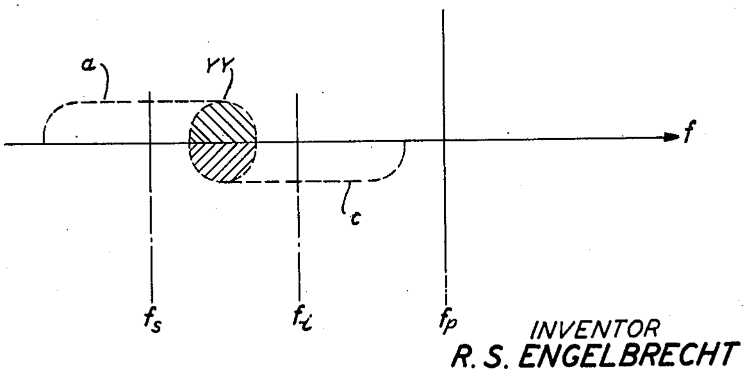

In FIG. 3C a similar graphical display is made of the corresponding signals as they appear in the lower amplifier 8. It is to be noted that the curve *b* of FIG. 3B is replaced in FIG. 3C by in inverted counterpart designated curve *c*. For illustration, this geometric inversion represents the $\pi$ radian phase shift imposed upon the idler wave in the lower amplifier 8 by the phase shift with which the energy wave is applied from the source 18.

Whatever the phase of this idler wave, in the lower amplifier destructive interference continues to exist insofar as the signal wave is concerned. This interference results from the frequency overlap of the signal and idler waves and, as illustrated by the hatched area designated YY, it is independent of the phase of the two waves. As appears to the eye, however, by adding the two dashed curves of FIG. 3C to the two dashed curves of FIG. 3B, the idler wave curves *b* and *c* cancel one another because of the phase difference in these waves in the lower and upper amplifiers, respectively. Similarly, a subtraction between these two pairs of dashed curves leads to a cancellation of the dashed curves which represent the signal wave and which are designated *a* in both FIGS. 3B and 3C.

The output hybird network 32 receives at the input terminal 33 a signal corresponding to the curves *a* and *b* of FIG. 3*B* and, at the input terminal 35, a signal corresponding to the curves *a* and *c* of FIG. 3C. Thus, at the sum or adding terminal 31 the signals corresponding to curves *b* and *c* provides mutual cancellation and the signals corresponding to the two curves *a* additively combine. Similiarly at the difference terminal 34 the absolute values of curves *b* and *c* are added while the signals of the curves *a* provide mutual cancellation. In this fashion, the structures of the invention are capable of amplifying a signal wave of markedly increased bandwidth, by inspection of FIG. 3B, of at least doubled bandwidth, without any mutual interference being presented by the signal and idler waves.

From the difference terminal 34 the combined signal at the idler wave frequency is applied to a utilization circuit 38 for detection and employment of the information contained therein.

The utilization circuit, designed for another principal purpose, may not be of a proper value to match the output impedance of the hybird network. Almost certainly it is not of a proper value over the broad frequency band accommodated by the amplifiers of the invention. Accordingly, some portion of the information bearing idler wave is reflected through the output hybird network and is reversely propagated through the parametric amplifiers 6 and 8 to the input bybird network 12.

These reversely propagated waves normally would give rise to further reflections and, as a consequence, to possible regenerative oscillations in these traveling wave amplifiers. Advantageously, these reversely propagated waves from the two implifiers 6 and 8 are applied respectively to the input terminals 13 and 15 associated with the input hybird network.

As the reflected waves pass from the utilization circuit 38 through the output hybird network 32 to the parametric amplifiers, the waves are shifted in phase by $\pi$ radians with respect to each other. This shift follows from the well-known reciprocity theorems which govern most transmission paths and do govern the simple paths of a conventional hybird network as shown. Thus, as these reflected idler waves are applied in opposed phase relationship to the terminals 13 and 15 of the input hybrid network, they are mutualy concelled insofar as any tendency might exist to propagate them through the additive terminal 11 to which the signal source 10 is connected. At the input hybird network difference terminal 14, however, these out-of-phase, reflected idler waves combine and are applied to an energy dissipating resistor 16.

Thus, in accordance with the invention, at one end or the other of the amplifying system there are provided energy dissipating impedances for each of the two waves, the signal wave and the idler wave, which are amplified by the system. At a corresponding opposite end of the system, an external circuit is provided for employment of the wave which is not so dissipated. Thus, useful waves of great bandwidth and amplified without any concern for internal reflections or any need for delicately adjusted impedance networks to be employed in connection with a variety of external circuits.

Figure 2:
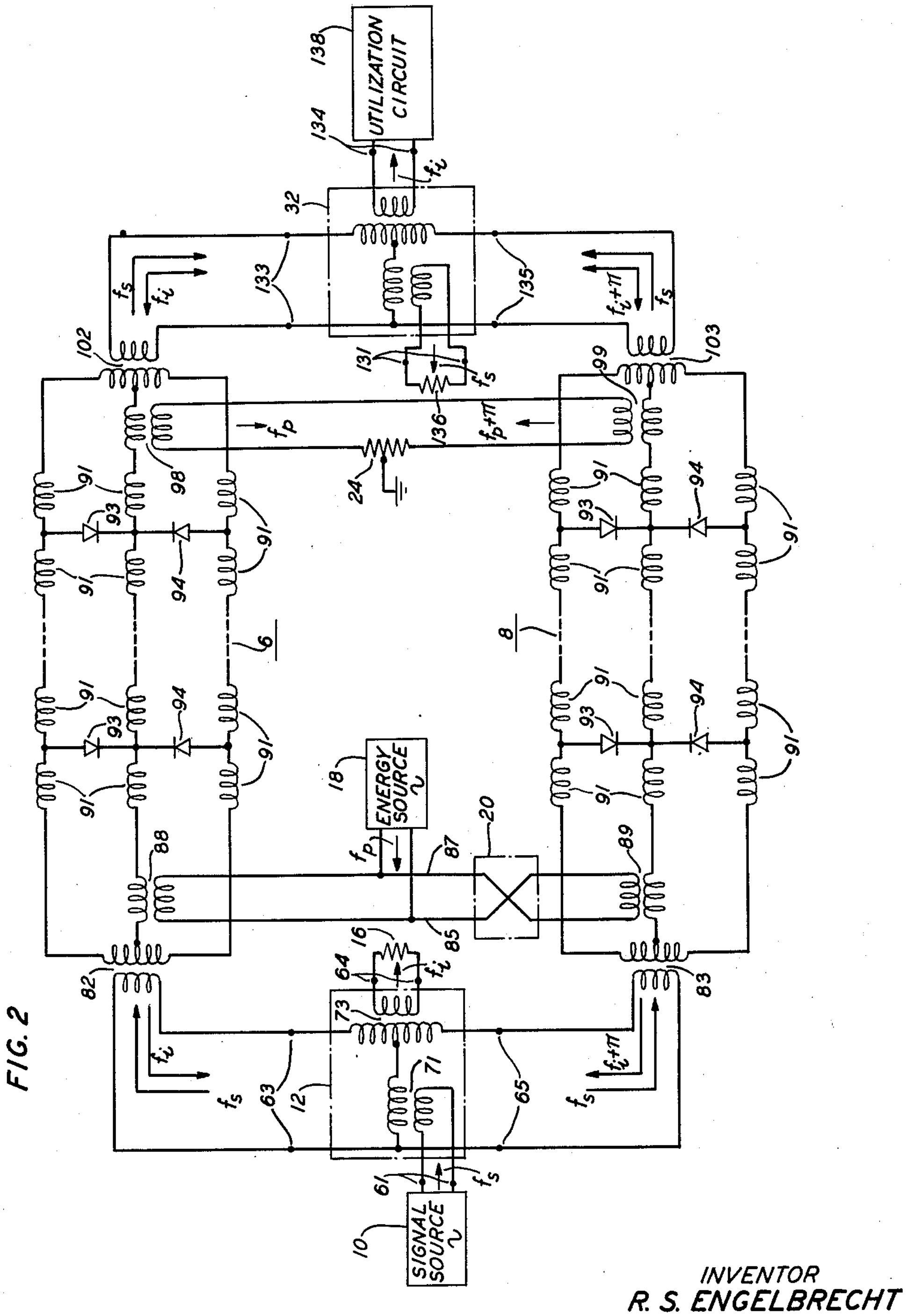
FIG. 2 is a schematic diagram of the parametric amplifying system in accordance with the specific illustrative embodiment of the invention shown in FIG. 1.

Turning next to FIG. 2, there is seen a schematic diagram of two three-conductor parametric amplifiers 6 and 8 connected in an amplifying system illustrating specific details of a system as shown in FIG. 1 and having similar structural elements with similar functions similarly numbered.

A communication signal wave from a source 10 is applied to an input hybird network 12 at the signal sum terminals 61 associated with this network. From these terminals the signal is applied to the primary winding of a transformer 71. The secondary winding of this transformer is symmetrically connected in series with two nominal input arms associated with this network. One terminal of the secondary winding of the transformer 71 is connected to a center tap on the primary winding of a transformer 73.

Input terminal pairs 63 and 65 which define the network input arms both have a common connection to the free terminal of the secondary winding of the transformer 71, and the remaining terminals of the pairs 63 and 65 are connected respectively at opposite ends of the primary winding of the transformer 73. The terminal pairs 63 and 65 are respectively coupled through transformers 82 and 83 across the two outer conductors of two three-conductor parametric amplifiers 6 and 8.

The secondary winding of the transformer 73 is connected to a difference output terminal pair 64, across which an energy dissipating load resistor 16 is connected. Inspection of the drawing reveals that in the hybird network 12 signals applied to the input terminal pairs 63 and 65 are additively combined across the transformer 71 and subtractively combined across the transformer 73.

A high frequency energy source 18 delivers an energy wave at a frequency $f_p$ through two conductors 85 and 87 to transformers 88 and 89. The secondary windings of these transformers are connected in serial arrangement with the center conductors of each of the three-conductors parametric amplifiers 6 and 8. In passing from the energy source 18 to the lower parametric amplifier 8 as shown, the conductors 85 and 87 are simply crossed to form a phase shifting network 20. Thus, the energy waves from the source 18 are applied in opposed phase relationship to each of the two parametric amplifiers 6 and 8.

Connected serially in each of the three conduction paths of the transmission systems which constitute the two parametric amplifiers are inductors 91. These inductors are representative of the actual and the distributed impedance elements associated with such a transmission system.

Spaced along each of the parametric amplifiers are oppositely poled pairs of semiconductor diodes 93 and 94 respectively connecting the outer conductors with the center conductor. These diodes are of the well-known type which presents to incoming signals a capacitance which is non-linearly variable in response to variations in amplitude of those signals. Such diodes are well known in the art and have been discussed, for example, by A. Uhlir, Jr. in the Proceedings of the Institute of Radio Engineers for June 1958 at pages 1099 et seq. As the energy wave from the source 18 is propagated along the parametric amplifiers 6 and 8, it acts successively upon the various pairs of diodes 93 and 94. Thus, the successive diodes arranged along the amplifiers 6 and 8 are varied in capacitance in dependence upon the instantaneous amplitude of the energy wave from the source 18.

This variation in capacitance under the influence of the propagated energy wave itself partakes of the nature of a wave of variable capacitance as the successive pairs of diodes 93 and 94 are varied along the two parametric amplifying paths 6 and 8. This variation in capacitance, or, more generally, this variation of reactance, is known in the art as a pump wave following as it does upon the propagation of the energy wave. Quite clearly, the pump waves in the two parametric amplifiers are in opposed phase relation owing to the opposed phase relation with which the energy wave is applied to the two amplifiers. A like effect may be obtained by elimination of the phase shifting network 20 and by reversing the polarities of the diodes 93 and 94 in one of the parametric amplifiers. Such an arrangement is within the comprehension of the invention, as the structure of the amplifiers combines with the energy wave applying means to constitute means for establishing pump waves of opposed phase relation in the two amplifiers.

The signal wave is applied in phase to each of the two parametric amplifiers 6 and 8 through the coupling transformers 82 and 83, respectively. It may as well be applied in opposed phase relationship to these two amplifiers without derogation of the operation of structures in accordance with the invention. In such a case, for example, the energy dissipating resistors 16 might be connected across the terminals 61 and the signal source 10 connected across the terminals 64.

In the specific embodiment of my invention, as shown in FIG. 2, the signal wave from the source 10, as it is propagated along the two amplifiers, receives energy from the source 18. This energy is received by way of the plural pairs of intercoupling diodes 93 and 94 in a phase which is determined by the aforementioned pump wave. As energy is intercoupled to the signal wave at a frequency determined by the pump wave, sideband wave products of the intermodulation action between the signal wave and the pump wave arise. The amplifiers 6 and 8 are constructed in accordance with well-known techniques such that the lower sideband wave or idler wave is propagated in a proper phase relationship with the signal wave and the pump wave so that energy is transferred from the energy wave to the idler wave as well as to the signal wave and in substantially equal amount to each of these two waves in each of the two amplifiers. Thus, in each of the parametric amplifiers 6 and 8, a growing signal wave and a growing idler wave are propagated from left to right as shown. The idler wave is dependent for its existence upon the intermodulation action between the pump wave and the signal wave. The pump wave arises in turn from the energy wave which controls the capacitance of the intercoupling diode pairs. Accordingly, the energy waves are applied to each of the two parametric amplifiers in opposed phase relation and give rise to an opposed phase relation between the pump waves associated with the respective amplifiers.

As a consequence, intermodulation action between the pump waves in the two amplifiers and the signal wave applied to both the amplifiers introduces a $\pi$ radian phase shift to one of the idler waves. The signal waves are applied to the two amplifiers in like phase. Accordingly, the idler waves are in opposed phase. Clearly, were the signal waves applied in opposed phase, the idler waves in each amplifier would be established in like phase by the opposed phase relationship of the pump waves. Thus, in accordance with the invention, the establishment of the opposed phase pump waves in the two paths leads to a phase separation between signal and idler waves. This phase separation enables direct separation of the waves themselves without costly filters and the like.

As the signal and idler waves are propagated beyond the right-hand pair of intercoupling diodes 93 and 94, energy from the source 18 which is not coupled to these waves passes through transformers 98 and 99. Thereafter, this energy is dissipated in resistor 24. The amplified idler and signal waves are coupled as composite amplifier output signals through transformers 102 and 103 and the input terminal pairs 133 and 135 to the output hybrid network 32. Here, the composite signals are added at terminal pairs 131 and subtracted at the terminal pairs 134. The added signals at the signal wave frequency $f_s$ are applied to an energy dissipating resistor 136. At the same time, the subtracted signals at the idler wave frequency $f_i$ are applied to a utilization circuit 138. Thereafter, any waves reflected within the system at the frequencies of the signal and idler waves are dissipated within the resistors 136 and 16, respectively.

While a specific illustrative embodiment of this invention has been described herein, it is, of course, to be understood that the described arrangements are merely illustrative of the application of the principles of the invention. Thus, numerous other arrangements may be devised by those skilled in the art without departing from the spirit and scope of the invention. For example, hybrid combining networks may be readily devised for accomplishing frequency separation of waves which are not directly opposite in phase relation. With such combining networks, it is clear that pump waves within the opposed phase relationship context of the invention need not be phase shifted to a directly opposing relation. Similarly, signal and idler waves may be separated in phase in the two amplifiers by angular amounts which differ substantially from an exact multiple of $\pi$ radians.

What is claimed is:

1. An amplifier system comprising: a pair of parametric amplifiers having input, pumping and output circuits; means for applying pumping signal energy at a frequency $\omega_3$ to each of said pumping circuits to parametrically pump said amplifiers with mutually opposite phase relationship; first and second signal translating networks, one responsive to a frequency $\omega_2$ and the other responsive to a frequency $\omega_1$, where $\omega_1+\omega_2=\omega_3$, coupled to said input circuits with one of said networks coupled in push-pull relationship and the other in parallel; and means coupled to said output circuits for deriving amplified signal energy therefrom.

2. Signal amplifying apparatus comprising a pair of parametric amplifiers, means for applying a signal wave to be amplified and an energy supplying wave to each amplifier of said pair, said means comprising means for applying said energy supplying wave to said amplifiers in opposed phase relation, an output network coupled to said amplifiers, said network comprising means for deriving at a first terminal thereof an amplified output wave comprising a signal sum of output signals generated by said amplifiers, means for deriving at a second terminal an amplified output wave comprising a signal difference of said output signals, said output signals comprising said signal wave and lower sideband wave produced by intermodulation between said signal wave and said energy supplying wave, and dissipating impedance means connected to one of said terminals, said applying means comprising an input network corresponding to said output network and having an energy dissipating impedance connected to the input network terminal corresponding to the other of said output network terminals.

3. Signal amplifying apparatus comprising first and second parametric amplifiers, means for applying a signal wave to be amplified to each of said amplifiers, means for applying an energy supplying wave to said amplifiers in opposed phase relationship whereby there is generated an idler wave in each of said amplifiers, the phase relationship between signal wave and idler wave in one amplifier being different from that of the other amplifier, an output network having four terminals, one of said terminals being connected to the output of said first amplifier and another of said terminals being connected to the output of said second amplifier, said network including means for deriving at a third terminal thereof amplified signal waves only and at the fourth terminal thereof amplified idler waves only.

4. Signal amplifying apparatus as claimed in claim 3 wherein utilization means is connected to one of said third and fourth terminals and energy dissipating means is connected to the other of said third and fourth terminals.

5. Signal amplifying apparatus as claimed in claim 4 wherein said means for applying signal waves to said amplifiers comprises an input network having four terminals, the signal being applied to one of said terminals, two of the remaining terminals each being connected to one of said amplifiers, and energy dissipating means being connected to the remaining terminal.

6. Apparatus for amplifying a signal wave comprising a pair of traveling wave parametric amplifiers of like electrical length, means for applying a signal wave and an energy wave to each amplifier of said pair, said amplifiers and said applying means comprising means responsive to said applied energy wave for etsablishing in opposed phase relation pump waves of intercoupling between said signal wave and said energy wave, thereby to transfer energy from said energy wave to said signal wave and to lower sideband waves produced by intermodulation action between said signal waves and said pump waves, and an output network connected for receiving output signals comprising said signal wave and said lower sideband waves from both amplifiers of said pair, said network comprising means for deriving at a first terminal an amplified output wave comprising a signal sum of output signal generated by said amplifiers and means for deriving at a second terminal an amplified output wave comprising a signal difference of said output signals.

7. Apparatus as set forth in claim 6 wherein said applying means comprises means for applying said energy wave to the amplifiers of said pair in opposed phase relation.

8. Apparatus as set forth in claim 6 wherein said applying means comprises an input network connected for receiving waves reflected from the amplifiers of said pair, said input network comprising means for deriving at a first terminal a signal sum of said received waves and means for deriving at a second terminal a signal difference of said received waves.

9. Apparatus as set forth in claim 4 wherein said applying means further comprises means for applying said signal wave to the first terminal of said input network and resistive means connected to the second terminal of said input network.

10. Apparatus as set forth in claim 6 and in combination therewith, utilization apparatus connected to one of said output network terminals.

11. Apparatus as set forth in claim 10 and in combination therewith, an energy dissipating impedance connected to the other of said output network terminals.

12. Signal wave amplifying apparatus comprising first and second traveling wave parametric amplifiers of like electrical length, means for applying a signal wave to each of said amplifiers, means for applying an energy wave to each of said amplifiers, said amplifiers and said energy wave applying means comprising means for establishing in said amplifiers mutually phase opposed pump waves of intercoupling between said applied energy wave and said applied signal wave, thereby to transfer energy from said energy wave to said signal wave and to lower sideband waves produced by intermodulation action between said signal wave and said pump waves, an output network for receiving said signal wave and the lower sideband waves from the amplifiers of said pair, said output network comprising means for deriving at a first terminal an amplified output wave comprising a signal sum of output waves generated by said amplifiers and means for deriving at a second terminal an amplified output wave comprising a signal difference of said output waves, said output waves comprising said signal wave and said lower sideband waves, signal utilization apparatus connected to one of said terminals and energy dissipating means connected to the other of said terminals.

13. Apparatus as set forth in claim 12 wherein said wave applying means comprises an input network for coupling said signal wave to the amplifiers of said pair, said input network comprising means for deriving at a first terminal a signal sum of signals reflected from said amplifiers and means for deriving at a second terminal a signal difference of said reflected signals.

14. Apparatus as set forth in claim 13 wherein said wave applying means comprises means for applying said signal wave to the first terminal of said input network and energy dissipating means connected to the second terminal of said input network.

15. Apparatus as set forth in claim 14 wherein said energy dissipating means comprises a resistor matched to the parallel connected impedance of the amplifiers of said pair.

References Cited in the file of this patent

UNITED STATES PATENTS

| | | |
|---|---|---|
| 2,629,782 | Ring | Feb. 24, 1953 |
| 2,847,517 | Small | Aug. 12, 1958 |
| 2,875,283 | Maione | Feb. 24, 1959 |

OTHER REFERENCES

Salzberg et al.: "Proceedings of the IRE," June 1958, page 1303.